(No Model.)
E. BARRATH.
KEY OPENING CAN.
No. 540,625. Patented June 11, 1895.
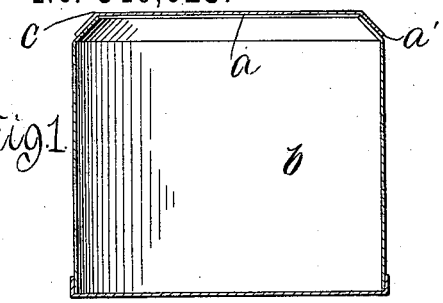
Fig. 1
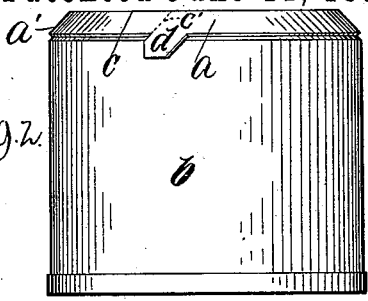
Fig. 2
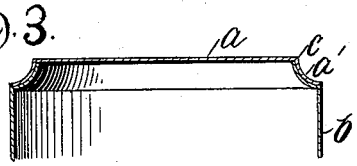
Fig. 3
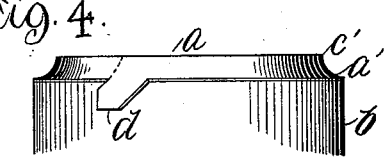
Fig. 4
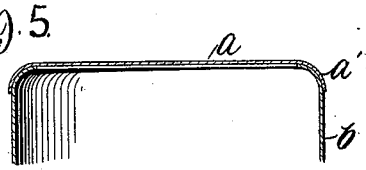
Fig. 5
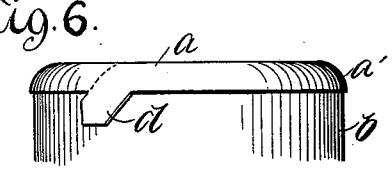
Fig. 6
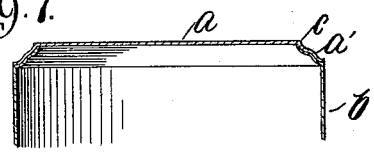
Fig. 7
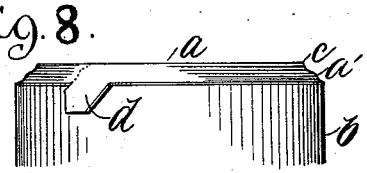
Fig. 8
Fig. 9
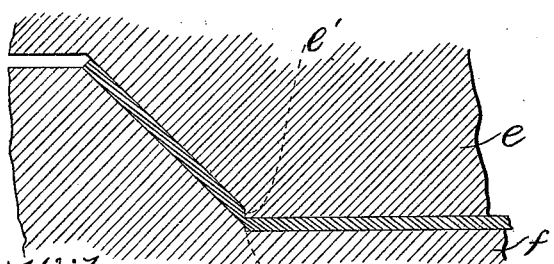
Fig. 10
Witnesses:
George L. Cragg
DeWitt C. Tanner
Inventor:
Edward Barrath.
By Barton & Brown
Attorneys.

UNITED STATES PATENT OFFICE.

EDWARD BARRATH, OF CHICAGO, ILLINOIS.

KEY-OPENING CAN.

SPECIFICATION forming part of Letters Patent No. 540,625, dated June 11, 1895.

Application filed September 10, 1894. Serial No. 522,664. (No model.)

*To all whom it may concern:*

Be it known that I, EDWARD BARRATH, a citizen of the United States, residing at Chicago, in the county of Cook and State of Illinois, have invented a certain new and useful Improvement in Key-Opening Cans, (Case No. 8,) of which the following is a full, clear, concise, and exact description, reference being had to the accompanying drawings, forming a part of this specification.

My invention relates to key opening cans, and its object is the provision of means for effectively removing a portion of the material of the can to permit access to the interior thereof.

Heretofore, it has been proposed to provide a can with a cover having a rim at right angles to the face thereof, a line of reduced strength being formed at the juncture of the rim and face, and terminating in one edge of a free lip the other edge of which is coextensive with the edge of the rim. As the metal of the cover possesses a decided grain, this pressing unto the cover a perpendicular rim causes the grain to run obliquely across the rim, so that the line of tear, instead of following the weakened line, is liable to follow the grain and thus remove a portion only of the rim. My invention herein is designed to overcome this objection, and consists, in its preferred form, of a can provided with a cover having a rim oblique to the face thereof, a circumferential line of reduced strength extending around the rim, preferably at the juncture of the face and rim, the line of reduced strength and the edge of the rim terminating in a free lip, whereby the oblique rim may be removed. By thus making the rim oblique, the metal of the rim is not strained and weakened, as when the rim is made perpendicular, nor is the obliqueness of the grain so marked, and, in consequence, the tendency of the line of tear to run across the rim is removed.

In concurrently filed applications for key opening cans, Serial Nos. 522,665 and 522,666, I have described specific modifications of my invention described herein, the claims of the present application relating broadly to a can in which the cover is provided with an oblique rim extending about the same, a line of reduced strength being provided at the juncture of the rim and the face of the cover, while the claims of said applications relate to specific forms of said general invention.

I will describe my invention in connection with the accompanying drawings, in which—

Figure 1 is a sectional view of a can embodying my invention. Fig. 2 is an elevation thereof. Fig. 3 is a sectional view of a can in which the rim is strengthened by being curved inwardly. Fig. 4 is an elevation thereof. Fig. 5 is a sectional view of a modified form, the rim being curved outwardly. Fig. 6 is an elevation thereof. Fig. 7 is a sectional view of a modified form in which the rim is corrugated. Fig. 8 is an elevation thereof. Fig. 9 is an elevation of a can in which the free lip is formed from a portion of the rim and does not project beyond its edge. Fig. 10 is a sectional view illustrating the manner in which the weakened line is formed in the metal as the rim is being turned down.

Like letters of reference refer to similar parts throughout the different figures.

As shown in Fig. 1, the cover $a$ is provided with an oblique rim $a'$, the upper edge of the can body $b$ being likewise formed oblique to accommodate the oblique rim. A line of reduced strength $c$ is formed, preferably at the juncture of the rim and face of the cover, and terminates in one edge of the free lip $d$, the oblique line of reduced strength $c'$ joining the edge of the lip with the line $c$. When it is desired to remove the cover the lip $d$ is grasped with a key and the rim torn away, thus giving access to the interior of the can.

In Fig. 3 the rim is curved inwardly to thereby reinforce and strengthen the same, thus affording an additional precaution against tearing across the rim.

In Fig. 5 the rim is reinforced by bending the metal outwardly, while in Fig. 7 the rim is corrugated.

In Fig. 9 is shown a free lip formed by an incision in the rim, the lip not projecting beyond the edge of the rim.

I preferably form the weakened line by shearing slightly the metal between the rim and the face of the cover, as illustrated in Fig. 10, the dies $e$ and $f$, which are adapted to be approached to bend the rim into position, being provided with offset portions which coact to shear the metal. The offset on the upper die is in the form of a cylindrical projection $e'$, while the offset on the lower die is in the form of a cylindrical depression $f'$, the diameter of the projection $e'$ being preferably slightly less than the diameter of the recess $f'$. As the upper die descends the face of the cover is pressed into the recess, thus partially shearing the metal at the juncture of the rim and the face of the cover, and affording a line of reduced strength extending circumferentially about the cover. While it is preferable to employ the oblique line of reduced strength joining the edge of the lip and the circumferential line of reduced strength, it may be omitted, particularly if the rim be narrow, and I do not wish to limit myself in this particular.

Having described my invention, what I claim as new, and desire to secure by Letters Patent, is—

1. The combination with a can provided with an oblique rim extending around the same, a line of reduced strength being provided between the rim and the face of the cover, of a free lip provided upon said cover adapted to be grasped to tear said cover along said line of reduced strength and remove said oblique rim, and a can body provided with an oblique flange upon which the oblique rim of said cover is adapted to rest, substantially as described.

2. A can cover provided with an oblique rim extending about the same, said rim and the face of the cover being sheared relatively to one another to produce a circumferential line of reduced strength at the juncture of the rim and face, and a free lip provided upon said cover adapted to be grasped to tear said cover along said line of shear, substantially as described.

3. A can cover provided with an oblique rim extending about the same, said rim and the face of the cover being sheared relatively to one another to produce a circumferential line of reduced strength at the juncture of the rim and face, a free lip and a line of reduced strength joining one edge thereof with said circumferential line of reduced strength, substantially as described.

4. The method of forming a can cover with an oblique rim and a line of reduced strength extending about the same, which consists in bending said rim into an oblique position, and partially shearing the metal joining said rim with the face of the cover, substantially as described.

In witness whereof I hereunto subscribe my name this 8th day of September, A. D. 1894.

EDWARD BARRATH.

Witnesses:
W. CLYDE JONES,
GEORGE L. CRAGG.